US008051456B2

(12) United States Patent
Kim

(10) Patent No.: US 8,051,456 B2
(45) Date of Patent: Nov. 1, 2011

(54) METHOD OF STORING BROADCASTING PROGRAM AND MOBILE COMMUNICATION TERMINAL USING THE SAME

(75) Inventor: Ji Tae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 608 days.

(21) Appl. No.: 11/589,974

(22) Filed: Oct. 31, 2006

(65) Prior Publication Data

US 2007/0101396 A1 May 3, 2007

(30) Foreign Application Priority Data

Oct. 31, 2005 (KR) ........................ 10-2005-0103153

(51) Int. Cl.
*H04N 7/173* (2006.01)

(52) U.S. Cl. ..................... 725/134; 455/550.1; 455/566; 725/62; 725/133

(58) Field of Classification Search ........................ None
See application file for complete search history.

(56) References Cited

U.S. PATENT DOCUMENTS 7,861,265 B2 12/2010 Kawakami
2002/0002039 A1* 1/2002 Qureshey et al. ............ 455/344
2002/0122656 A1* 9/2002 Gates et al. .................... 386/46
2003/0081939 A1* 5/2003 Kim et al. ....................... 386/67
2003/0110504 A1* 6/2003 Plourde et al. ................. 725/89
2004/0017999 A1* 1/2004 Bradstreet et al. ............. 386/68
2004/0109672 A1 6/2004 Kim et al.
2004/0229655 A1* 11/2004 Jang ............................. 455/566
2005/0163477 A1* 7/2005 Kendall .......................... 386/68
2005/0193408 A1* 9/2005 Sull et al. ........................ 725/32
2005/0229213 A1* 10/2005 Ellis et al. ....................... 725/58

FOREIGN PATENT DOCUMENTS

CN 1418010 A 5/2003
CN 1627809 A 6/2005
EP 1-239-674 A2 9/2002
EP 1-309-195 A2 5/2003
KR 10-2006-0025386 A 3/2006

* cited by examiner

*Primary Examiner* — Rafael Pérez-Gutiérrez
*Assistant Examiner* — Daniel Nobile
(74) *Attorney, Agent, or Firm* — Birch, Stewart, Kolasch & Birch, LLP

(57) ABSTRACT

A broadcasting program storing method of a mobile communication terminal and a mobile communication terminal using the same are disclosed. The method includes according to an embodiment allocating and storing a presently receiving broadcasting stream to and in at least one time section of a plurality of time sections while playing a broadcasting stream, and selecting at least one time section from the plural time sections to reproduce a broadcasting stream allocated to the selected time section. Thus, the broadcasting stream can be stored in real time while viewing the broadcasting program and the stored broadcasting stream can be easily searched for or reproduced.

21 Claims, 5 Drawing Sheets

METHOD OF STORING BROADCASTING PROGRAM AND MOBILE COMMUNICATION TERMINAL USING THE SAME

This application claims the priority benefit of Korean Patent Application No. 10-2005-0103153, filed on Oct. 31, 2005, which is hereby incorporated by reference as if fully set forth herein.

BACKGROUND OF THE INVENTION

1. Field of the Invention

The present invention relates to a mobile communication terminal with a broadcasting receiving function, and more particularly, to a method of storing broadcasting programs in a mobile communication terminal and a mobile communication terminal using the same.

2. Discussion of the Related Art

A mobile communication terminal with a broadcasting receiving function according to the related art will be described as follows.

The mobile communication terminal according to the related art performs the recording of a broadcasting program received at a specific time when a user selects a recording function. The recording function may be set before the reception of the broadcasting program to be recorded or during the reception of the broadcasting program.

In order to view the recorded broadcasting program, the user stops playing the broadcasting program currently being received and then manipulate keys to play the recorded broadcasting program.

That is, according to the related art, in order to view the recorded broadcasting program, the user must stop the presently receiving broadcasting program and select the stored program using complicated key/menu manipulation, which is complicated and inconvenient to the user.

Moreover, according to the related art, when recording the broadcasting program, how to use a memory space to efficiently store and to easily search the recorded broadcasting program is never considered.

SUMMARY OF THE INVENTION

Accordingly, the present invention is directed to a method of recording a broadcasting program and a mobile communication terminal using the same that substantially obviate one or more problems due to limitations and disadvantages of the related art.

An object of the present invention is to provide a method of reproducing a stored or recorded broadcasting program while playing a presently broadcasting program and a mobile communication terminal using the same.

Another object of the present invention is to provide a method of effectively using a memory space when storing and/or recording a broadcasting program and a mobile communication terminal using the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a broadcasting stream storing method of a mobile communication terminal according to an embodiment includes: allocating and storing a presently receiving broadcasting stream to and in at least one time section of a plurality of time sections while playing a broadcasting stream; and selecting at least one time section from the plural time sections to reproduce a broadcasting stream allocated to the selected time section.

In another aspect of the present invention, a mobile communication terminal with a broadcasting program storing function includes: a broadcasting receiving module to receive a broadcasting stream for forming a broadcasting program; a memory to allocate and store the broadcasting stream received through the broadcasting receiving module to and in at least one time section of a plurality of time sections while a broadcasting program is played; an input unit to generate a selecting signal to select at least one time section from the plural time sections; and a controller to reproduce a broadcasting stream allocated to the selected time section according to the selecting signal.

According to an aspect of the present invention, there is provided a broadcasting stream storing method of a mobile communication terminal including allocating and storing a presently receiving broadcasting stream to an in at least one time section of a plurality of time sections while playing a broadcasting stream, and selecting at least one time section from the plural time sections to reproduce a broadcasting stream allocated to the selected time section.

According to an aspect of the present invention, there is provided a mobile communication terminal with a broadcasting program storing function including a broadcasting receiving module to receive a broadcasting stream for forming a broadcasting program, a memory to allocate and store the broadcasting stream received through the broadcasting receiving module to and in at least one time section of a plurality of time section while a broadcasting stream is played, an input unit to generate a selecting signal to select at least one time section from the plural time sections, and a controller to reproduce a broadcasting stream allocated to the selected time section according to the selecting signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Moreover, in the following description of the present invention, if the detailed description of the already known structure and operation may confuse the subject matter of the present invention, the detailed description thereof will be omitted.

Figure 1:
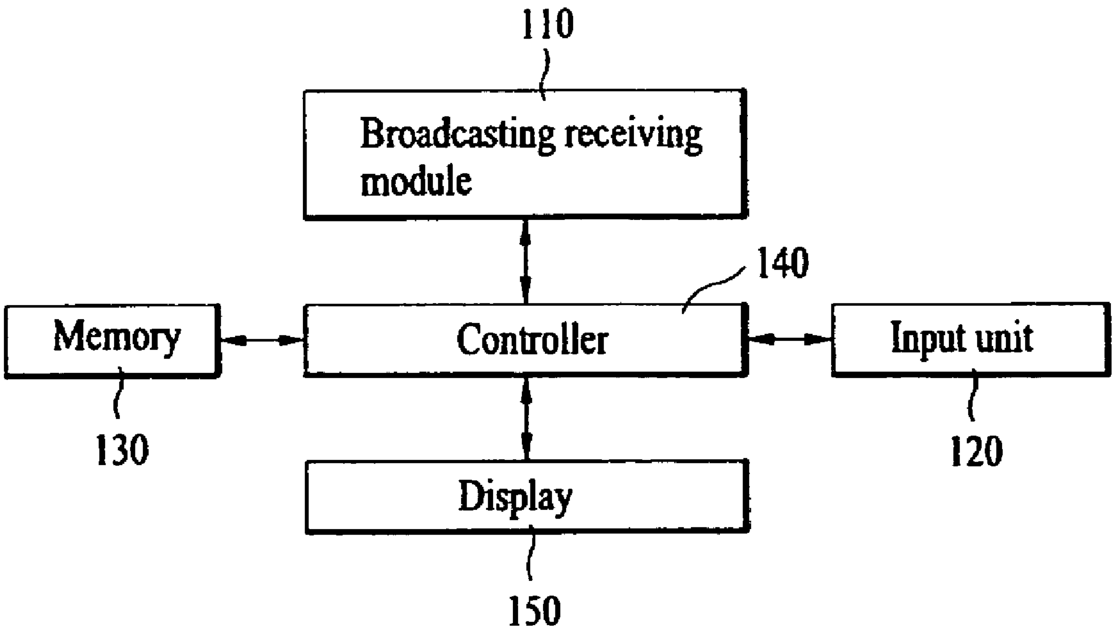
FIG. 1 illustrates a block diagram of a mobile communication terminal with a broadcasting program storing function according to an embodiment of the present invention.

Referring to FIG. 1, a mobile communication terminal with a broadcasting program storing function according to an embodiment of the present invention will be described in detail as follows.

As shown in FIG. 1, the mobile communication terminal includes a broadcasting receiving module 110, an input unit 120, a memory 130, a controller 140, and a display 150. The mobile communication terminal includes or can include other components provided in related art communication terminals, such as a speaker, etc. All components of the mobile communication terminal are operatively configured and coupled.

The broadcasting receiving module 110 receives broadcasting programs and data relating to the broadcasting program through a broadcasting network. Generally, the broadcasting network is a broadcasting network based on a digital broadcasting standard such as a digital multimedia broadcasting (DMB), a digital video broadcasting-handheld (DVBH), a media forward link only (FLO), and the like.

Moreover, the broadcasting receiving module 110 receives stream type broadcasting programs and other data.

The input unit 120 generates a signal corresponding to an input action of a user.

The memory (or other storage unit) 130 stores all data inputted to and outputted from the mobile communication terminal and stores a variety of broadcasting programs to implement functions and operations of the mobile communication terminal.

Particularly, in the present invention, the memory 130 allocates (or assigns) a broadcasting stream received through the broadcasting receiving module 110 to at least one time section among a plurality of time sections, and stores the received broadcasting stream in the allocated at least one time section in the memory 130. For instance, the memory 130, under control of the controller, simultaneously or almost simultaneously assigns and stores the broadcasting streams currently being received (e.g., via an antenna or being uploaded) to the time sections in sequence. The information associating the time section (e.g., index) and the broadcasting stream(s) stored therein is stored in the memory 130. Also, the locations of the time sections are stored for accessing the time sections subsequently. As a result, storing of the currently received broadcasting streams in the sections can occur while the currently received broadcasting streams are being played on the terminal.

The plurality of time sections are created by storing spaces divided from an overall storing space of the memory 130 (or part thereof) according to a predetermined basis.

For example, the memory 130 allocates and stores therein the received broadcasting stream to and in the time sections at uniform time intervals. In another example, the memory 130 allocates and stores therein the received broadcasting stream to and in the time sections at an interval of a uniform frame number. In this case, in the plural time sections, an index to distinguish the respective time sections may be set.

Figure 4:
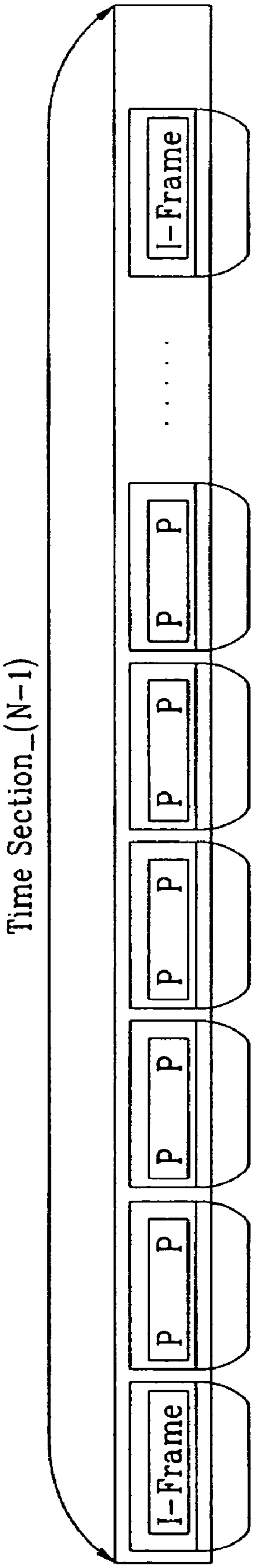
FIG. 4 illustrates an example of a broadcasting stream stored in one time section according to the present invention.

Moreover, the broadcasting stream allocated in the time sections includes a plurality of frames. In this case, in the plural frames allocated in a certain time section, as shown in FIG. 4, first and final frames are intra-coded images-frames (I-frames) and other frames are predictive-coded images-frames (P-frames).

Particularly, in the present invention, the input unit 110 may generate a setting signal of a time shifting mode, e.g., according to the user's input. Here, the time shifting mode is a mode to search or reproduce a past broadcasting stream while viewing a present broadcasting program. Thus, the controller 140, according to the setting signal, sets the time shifting mode to the mobile communication terminal to perform an operation according to the time shifting mode.

Moreover, the input unit 110 may generate a selecting signal with respect to at least one time section of the plural time sections. In this case, the display 150 displays information about the respective plural time sections, and the user can select the time section to which a broadcasting stream to be reproduced is allocated with reference to the information displayed on the display 150. The information may be a frame positioned at the first place of the respective time sections or a receiving time of the broadcasting stream stored in the respective time sections.

For example, the user can select a desired time section using a 'rewind' key (or other designated key) provided in the input unit 110. If the 'rewind' key is pressed for a predetermined time period or more, the input unit 110 generates a selecting signal to select a first time section in which the broadcasting stream is firstly stored. In another example, when the 'rewind' key is pressed once, the input unit 110 generates a selecting signal to select a time section in which the broadcasting stream is stored most recently. In another example, when the 'rewind' key is pressed three times sequentially, the input unit 110 generates a selecting signal to select a time section in which the third most recent broadcasting stream is stored. Other examples are possible.

Moreover, the input unit 110 may generate a selecting signal to select another time section or a reproducing signal to reproduce a presently receiving broadcasting stream when the stored broadcasting stream is reproduced.

For example, the user can select another desired time section using a 'fast forward' key (or other designated key) provided in the input unit 110. When the 'fast forward' key is pressed for a predetermined time period or more, the input unit 110 generates a selecting signal to select a time section in which the broadcasting stream is stored most recently. In another example, when the 'fast forward' key is pressed once, the input unit 110 generates a selecting signal to select a time section next to a time section in which a presently reproducing broadcasting stream is stored. In another example, when the 'fast forward' key is pressed three times, the input unit 110 generates a selecting signal to select a time section positioned at the third position from the time section in which the presently reproducing broadcasting stream is stored.

Moreover, the user can select a reproduction of a presently receiving broadcasting stream using a 'play' key (or other designed key) provided in the input unit 110. In other words, when the 'play' key is pressed, the input unit 110 generates a reproducing signal to reproduce the presently receiving broadcasting stream. So by a single action of selecting the 'play' key in the time shift mode, the switch to playing the currently receiving broadcasting stream from playing a stored broadcasting stream can occur, which is convenient to the user.

Additionally, the input unit 110 may generate a selecting signal to select a time section of the plural time sections to be repeatedly reproduced. In this case, the repeatedly reproducing time section may be selected in a storing unit or in the frame unit of the broadcasting stream.

The controller 140 controls the overall operation of the mobile communication terminal.

Particularly, in the present invention, before storing the receiving broadcasting stream, the controller 140 determines whether or not there is a storing space in the memory 130 where the receiving broadcasting stream can be stored. If it is determined there is no storing space, the controller 140 deletes at least one time section of the plural time sections in the order of time when the broadcasting stream is stored, so as to create the storing space in the memory 130.

Moreover, in the present invention, the controller 140 reproduces the broadcasting stream allocated in the time section selected according to the selecting signal generated by the input unit 110.

For example, when reproducing the stored broadcasting stream, the controller 140 can reproduce the broadcasting stream allocated to the selected time section and a broadcasting stream next to the broadcasting stream allocated to the selected time section and allocated to the next time section.

Moreover, when receiving a reproduction stopping signal from the user or when the presently reproducing broadcasting stream is synchronized with the presently receiving broadcasting stream, the controller 140 can stop the reproduction of the stored broadcasting stream. When the reproduction of the stored broadcasting stream is stopped, the controller 140 can reproduce the presently receiving broadcasting stream according to the user's choice.

For example, the controller 140 determines whether or not a frame of the presently reproducing stored broadcasting stream is a frame last stored in the memory 130. If, as a result of this determination, the last stored frame is determined, the controller 140 determines that the frame of the presently reproducing stored broadcasting frame is synchronized with the frame of the presently receiving broadcasting stream. The controller 140 reproduces the frame of the presently receiving broadcasting stream.

The display 150 displays a status of the mobile communication terminal and a variety of information stored in the mobile communication terminal. Particularly, in the present invention, the display 150 displays the presently receiving broadcasting stream or the stored broadcasting stream allocated to the selected time section according to a control signal from the controller 140.

Figure 2:
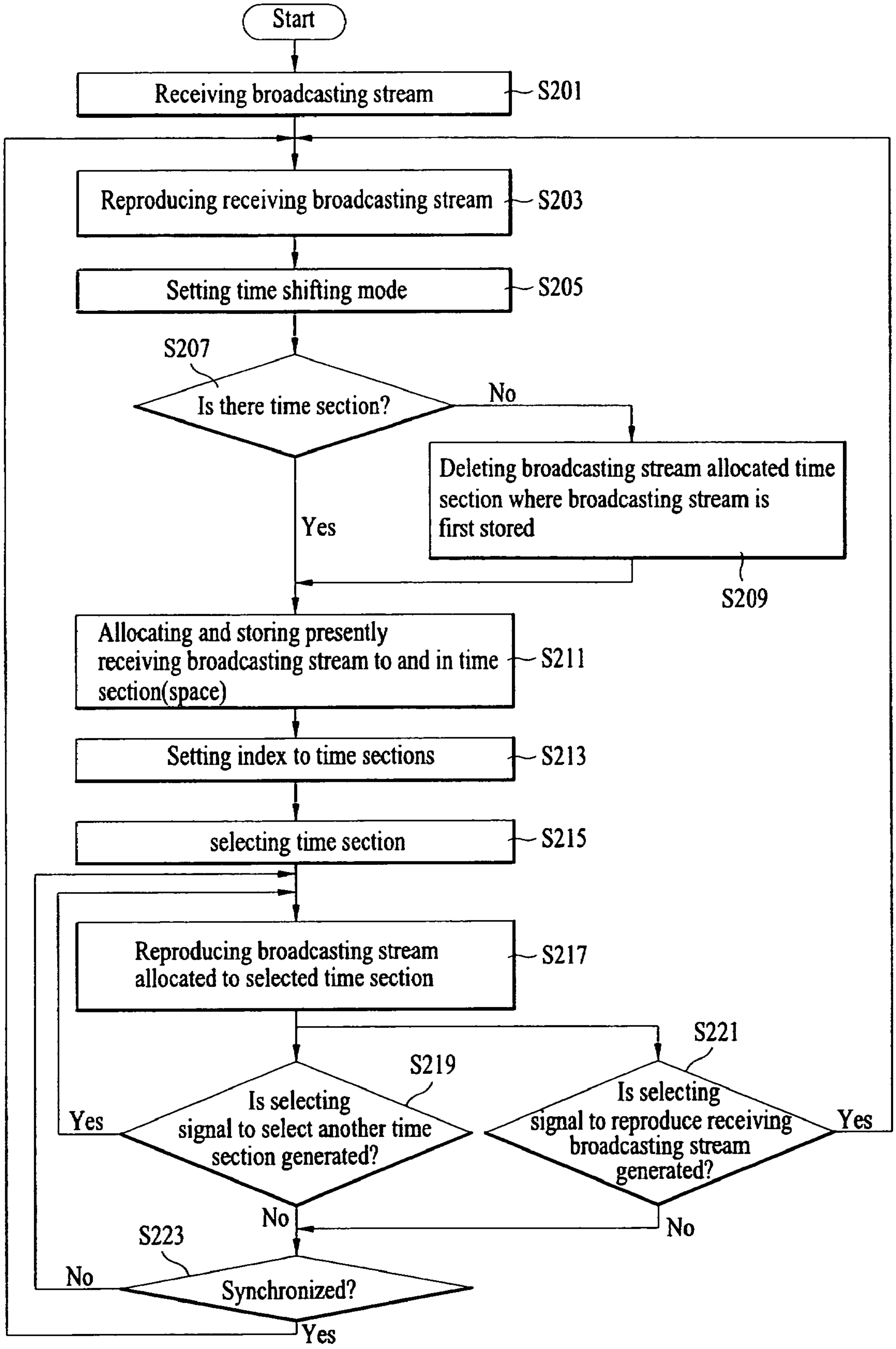
FIG. 2 illustrates a flowchart of a method of a mobile communication terminal of storing and reproducing a broadcasting program according to an embodiment of the present invention.

Referring to FIG. 2, the broadcasting program storing method of a mobile communication terminal according to the present invention will be described in detail as follows. This method is implemented by the terminal of FIG. 1, but can be implemented in other suitable devices.

Referring to FIG. 2, the mobile communication terminal receives a stream type broadcasting network (S201). In this case, the broadcasting program may include a broadcasting stream transmitted in real time.

Here, the broadcasting network is a broadcasting network based on a digital broadcasting standard such as a digital multimedia broadcasting (DMB), a digital video broadcasting-handheld (DVBH), a media forward link only (FLO), and the like.

The mobile communication terminal reproduces the receiving broadcasting stream (S203). Thus, the mobile communication terminal displays the presently receiving broadcasting stream.

The mobile communication terminal sets a time shifting mode (S205). Generally, the time shifting mode may be set according to a user's choice.

As the time shifting mode is set, the mobile communication terminal sets a state to perform the operation corresponding to the setting.

The mobile communication terminal, in the time shifting mode, determines whether there is a space (time section) to store the presently receiving broadcasting stream in the storing space of the mobile communication terminal (S207).

If it is determined there is no storing space (time section) as a result of the checking, the mobile communication terminal eliminates the broadcasting stream allocated to at least one time section from the memory in the order of storing time (S209). For example, the mobile communication terminal can delete at least one time section of the plural time sections of its memory in the order of time when the broadcasting stream is stored, so as to create a storing space.

If there is a storing space as a result of the determination at step S207 (or because the space has been created as a result of step S209), the mobile communication terminal allocates and stores the receiving broadcasting stream to and in at least one available time section of the plural time sections in the memory (S211). Here, the plural time sections mean storing spaces divided from an overall storing space of the mobile communication terminal according to a predetermined basis.

For example, the mobile communication terminal allocates and stores the receiving broadcasting stream to and in a desired time section at a uniform time interval. In another example, the mobile communication terminal allocates and stores the receiving broadcasting stream to and in the time sections at an interval of a uniform frame number. In this case, in the plural time sections, an index to distinguish the respective time sections may be set (S213). Thus, the user can easily search and select the time sections using the set indices.

In the present example, the broadcasting stream allocated in the time sections includes a plurality of frames. For example, in the plural frames allocated in a certain time section, as shown in FIG. 4, first and final frames are intra-coded images-frames (I-frames) and other frames are predictive-coded images-frames (P-frames). The mobile communication terminal selects at least one time section from the plural time sections (S215).

For example, when information about the respective plural time sections is displayed, the user can select the time section to which the broadcasting stream to be reproduced is allocated with reference to the displayed information.

Then the mobile communication terminal reproduces the broadcasting stream allocated to the selected time section from the memory (S217). The mobile communication terminal displays the reproducing broadcasting stream on its display.

For example, when reproducing the stored broadcasting stream, the mobile communication terminal can reproduce the broadcasting stream allocated to the selected time section from the memory, and a broadcasting stream next to the broadcasting stream allocated to the selected time section and allocated to the next time section.

The mobile communication terminal determines whether or not a selecting signal to select another time section is generated (e.g., is there a selection of another time section), during the performance of the step S217 or thereafter (S219).

If it is determined at step S219 the selecting signal is generated, the mobile communication terminal reproduces the broadcasting stream allocated to the time section selected in step S219 (S217).

On the other hand, if it is determined at step S219 the selecting signal is not generated, the mobile communication terminal determines whether the presently reproducing stored broadcasting stream is synchronized with the currently receiving broadcasting stream (S223). If so, the method returns to step S203.

The mobile communication terminal determines whether a reproducing signal of the currently receiving broadcasting stream is generated or not during or after the performance of step S217 (S221). As a result of this determination, if the reproducing signal is generated, the mobile communication terminal stops the reproduction of the stored broadcasting stream allocated to a desired time section, and reproduces the presently receiving broadcasting stream (S203).

On the other hand, if step S221 determines that the reproducing signal is not generated, the mobile communication terminal determines whether the presently reproducing stored broadcasting stream is synchronized with the presently receiving broadcasting stream (S223).

For example, the mobile communication terminal determines whether a frame of the presently reproducing stored broadcasting stream is a last stored frame or not. If it is, the mobile communication terminal can determine that the frame of the presently reproducing broadcasting frame is synchronized with the frame of the receiving broadcasting stream.

Figure 3:
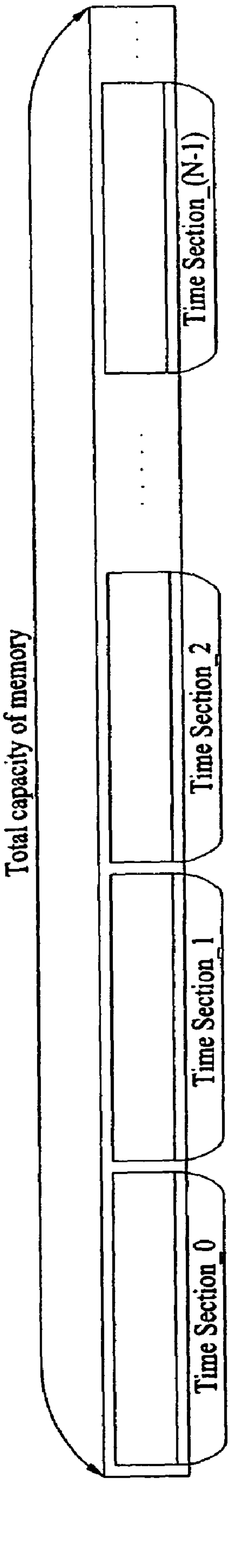
FIG. 3 illustrates an architecture of overall memory having a plurality of storing spaces according to an embodiment of the present invention.

Referring to FIG. 3, a total capacity of the memory 130 including the plural time sections according to the present invention will be described as follows.

As shown in FIG. 3, the total capacity of the memory 130 is divided into the plural time sections Time Section_0, Time Section_1, Time Section_2, . . . , and Time Section_(N−1) for the management thereof. Thus, the receiving broadcasting stream is stored in at least one time section of the plural time sections sequentially in the order of the broadcasting streams are received.

The total capacity of the memory 130 is divided into the plural time sections at a predetermined time interval or by a predetermined number of frames.

For example, when the total capacity of the memory 130 is full, a broadcasting stream allocated to the first positioned time section Time Section_0 is firstly deleted, and after that, following broadcasting streams are deleted sequentially, so as to create a memory space.

Figure 5:
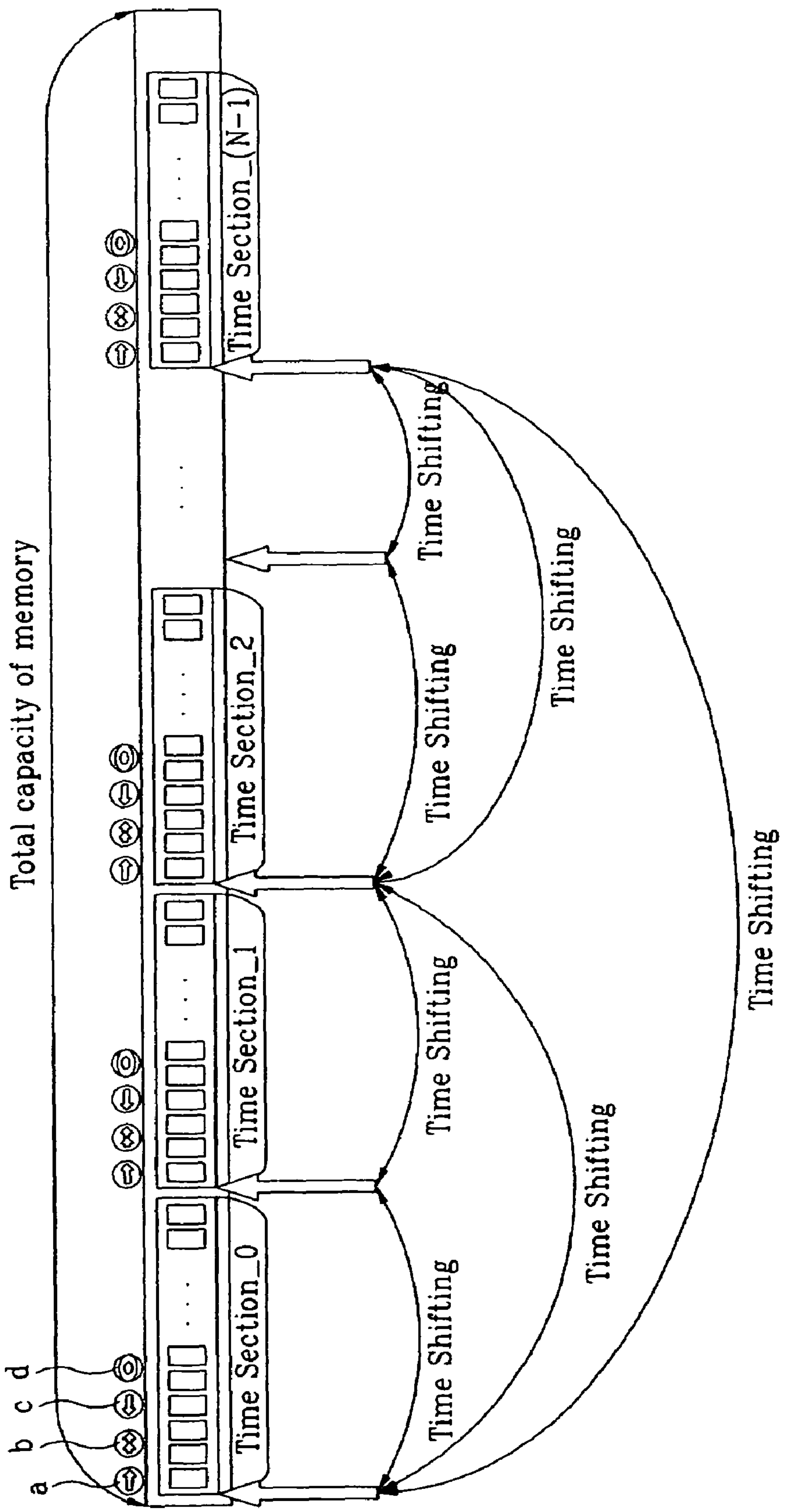
FIG. 5 illustrates an example of a search and reproduction operation of a broadcasting stream in a time shifting mode according to the present invention.

Referring to FIG. 5, the searching and reproducing of the broadcasting stream according to the time shifting mode of the mobile communication terminal will be described in detail as follows.

As shown in FIG. 5, in this example, the total capacity of the memory 130 is divided into the plural time sections Time Section_0, Time Section_1, Time Section_2, . . . , and Time Section_(N−1) where N is a positive integer, for the management thereof.

When the time shifting mode is set to the mobile communication terminal, the user selects at least one from a 'play' key a, a 'fast forward' key b, a 'rewind' key c, and a 'repeat' key d (of the input unit 120) to select a broadcasting stream to be reproduced. In this case, the mobile communication terminal includes a user interface to receive a selection choice of the 'play' key a, the 'fast forward' key b, the 'rewind' key c, and the 'repeat' key d from the user.

When the 'rewind' key c is selected during the reproduction of the currently receiving broadcasting stream, the mobile communication terminal reproduces a stored broadcasting stream allocated to a certain time section of the plural time sections from the memory 130.

For example, when the 'rewind' key c is pressed for a predetermined time period or more, the mobile communication terminal reproduces broadcasting stream(s) allocated and stored to the respective time sections from Time Section_0 in which the broadcasting stream is stored first to the following time sections Time section_1, Time Section_2, . . . in sequence. In another example, when the 'rewind' key c is pressed once, the broadcasting stream allocated to the time section Time Section_(N−1) in which the broadcasting stream is stored most recently is reproduced. That is, the 'rewind' key c allows a user to select and play a time section that is first stored, most recently stored, or any particular time section.

If the 'play' key a is selected during the reproduction of the broadcasting stream allocated to a certain time section, the mobile communication terminal stops the reproduction of the stored broadcasting stream and reproduces the presently receiving broadcasting stream.

If the 'fast forward' key b is selected while reproducing a broadcasting stream allocated to a certain time section, the mobile communication terminal reproduces a broadcasting stream allocated to a time section positioned after the present time section. For example, when the 'fast forward' key b is pressed for a predetermined time period or more, the mobile communication terminal reproduces a broadcasting stream allocated to the time section Time Section_0 in which the broadcasting stream is first stored. If the 'fast forward' key b is pressed once, the mobile communication terminal generates a selecting signal to select a time section immediately next to the time section to which the present reproducing stored broadcasting stream is allocated. For instance, using the 'fast forward' key b, the user can jump from one time section to another time section for playing.

If the 'repeat' key d is selected while reproducing a broadcasting stream allocated to a certain time section, the mobile communication terminal may repeatedly reproduce the same broadcasting stream(s) in a predetermined number of the time sections.

For example, if the 'repeat' key d is pressed once at a starting point of a time section to be repeated and the 'repeat' key d is pressed once again at an ending point of the time section to be repeated, the broadcasting stream(s) corresponding to the selected time section(s) can be repeatedly reproduced. The selecting of the 'repeat' key d to set the start and end points of the broadcasting stream(s) in the time section(s) to be repeated, can be made while the stored broadcasting stream(s) are played under the use of the keys b and c.

Accordingly, using the keys a-d in the time shifting mode, the user can jump to and from any time section for search and reproduction.

Although the keys a-d in FIG. 5 have been used, other keys can be designated to carry out the time shifting mode of the mobile communication terminal. Also, other keys may be used in conjunction with the keys a-d to carry out the time shifting mode of the mobile communication terminal. The mobile communication terminal can be a mobile/cellular phone, a smart phone, a PDA, etc.

According to the present invention, a broadcasting stream is stored in real time simultaneously with viewing the broadcasting stream, which can be reproduced at any desired time.

Moreover, according to the present invention, since a total capacity of the memory is divided into the plural time sections for the management thereof, the capacity of the memory can be effectively managed.

Additionally, according to the present invention, since the index is set in the plural time sections to distinguish the respective time sections, a time section to be reproduced can be easily selected.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A broadcasting stream storing method of a mobile communication terminal, the method comprising:

receiving, via a receiving unit, a broadcasting stream including a broadcasting content to be viewed on a display unit of the mobile terminal;

displaying the received broadcasting content on the display unit of the mobile terminal;

receiving a command to request a time shifting mode;

allocating and storing the received broadcasting content to a plurality of individual and discrete time sections based on the input command requesting the time shift mode such that a predetermined amount of the broadcasting content is divided into and stored as the plurality of individual and discrete time sections;

before performing the storing, determining whether there is a storage space in the plurality of individual and discrete time sections;

deleting a portion of the broadcasting content allocated to at least one time section of the plurality of individual and discrete time sections and storing the received broadcasting content in the at least one time section corresponding the deleted portion of the broadcasting content when the determining step determines there is no storage space in the plurality of individual and discrete time sections;

receiving a command to reproduce one of the allocated plurality of time sections;

jumping to said one of the plurality of individual and discrete time sections in which said one of the plurality of individual and discrete time sections can be any one of the plurality of individual and discrete time sections;

reproducing said any one of the plurality of individual and discrete time sections; and switching to a reproduction of a broadcasting content included in a particular time section in response to a selection pattern of a designated key in the time shifting mode, wherein when the selection pattern comprises selecting the designated key for a predetermined time period or more, the switching step switches to the reproduction of the broadcast content included in the particular time section that was first stored, and wherein when the selection pattern comprises selecting the designated key for a predetermined number of times, the switching step switches to the reproduction of the broadcast content included in the particular time section that was stored the predetermined number of times before or after the currently reproducing content.

2. The broadcasting stream storing method of a mobile communication terminal according to claim 1, wherein, in the allocating and storing, the broadcasting content is allocated to one or more time sections at predetermined time intervals.

3. The broadcasting stream storing method of a mobile communication terminal according to claim 1, wherein, in the allocating and storing, the broadcasting content is allocated to one or more time sections by a predetermined number of frames.

4. The broadcasting stream storing method of a mobile communication terminal according to claim 1, further comprising:

providing indexes to respective time sections.

5. The broadcasting stream storing method of a mobile communication terminal according to claim 1, further comprising:

switching to a reproduction of a broadcasting content currently being received by the mobile communication terminal from the reproduction of the broadcasting content allocated to a selected time section, in response to a selection of a designated key in the time shifting mode.

6. The broadcasting stream storing method of a mobile communication terminal according to claim 1, further comprising:

receiving a request for reproducing another time section or for reproduction of a currently receiving broadcasting content while the broadcasting content allocated to a selected time section is being reproduced.

7. The broadcasting stream storing method of a mobile communication terminal according to claim 1, further comprising:

displaying a graphical user interface indicating the stored plurality of time sections on a display of the mobile communication terminal and play, fast forward and rewind trick play indicators at each corresponding time section such that a user can play, fast forward and rewind stored broadcast content corresponding to said each corresponding time section by respectively manipulating the play, fast forward and rewind trick play indicators.

8. The broadcasting stream storing method of a mobile communication terminal according to claim 7, wherein the displayed trick indicators further includes a repeat indicator such that the user can have stored broadcast content corresponding to said each corresponding time section be repeatedly displayed.

9. The broadcasting stream storing method of a mobile communication terminal according to claim 1, wherein the broadcasting content allocated to the selected time section includes a plurality of frames.

10. The broadcasting stream storing method of a mobile communication terminal according to claim 9, wherein first and final frames of the plurality of the frames are intra-coded image frames, and other frames are predictive-coded frames.

11. The broadcasting stream storing method of a mobile communication terminal according to claim 1, further comprising:

determining whether a presently reproducing stored broadcasting content is synchronized with a presently receiving broadcasting content while reproducing the stored broadcasting content; and reproducing the presently receiving broadcasting content according to the determination, wherein the determining step determines the presently receiving broadcasting content is synchronized with the presently reproducing broadcasting content when a frame of the presently reproducing broadcasting content is a frame in which the broadcasting content is last stored and without using time information of the frames.

12. A mobile communication terminal with a broadcasting program storing function, the mobile communication terminal comprising:

a broadcasting receiving module configured to receive a broadcasting stream including a broadcasting content;

a display configured to display the received broadcasting content;

an input unit configured to receive a command to request a time shifting function;

a memory configured to allocate and store the broadcasting content received through the broadcasting receiving module to a plurality of individual and discrete time sections such that a predetermined amount of the broadcasting content is divided into and stored as the plurality of individual and discrete time sections; and a controller configured to determine whether there is a storage space in the plurality of individual and discrete time sections before the broadcast content is stored, to delete a portion of the broadcasting content allocated to at least one time section of the plurality of individual and discrete time sections and store the received broadcasting content in the at least one time section corresponding the deleted portion of the broadcasting content when there is no storage space in the plurality of individual and discrete time sections, to receive a command to reproduce one of the allocated plurality of time sections, to jump to said one of the plurality of individual and discrete time sections in which said one of the plurality of individual and discrete time sections can be any one of the plurality of individual and discrete time sections, and to reproduce said any one of the plurality of individual and discrete time sections, wherein the controller is further configured to switch to a reproduction of a broadcasting content included in a particular time section in response to a selection pattern of a designated key in the time shifting mode, wherein when the selection pattern comprises selecting the designated key for a predetermined time period or more, the controller is further configured to switch to the reproduction of the broadcast content included in the particular time section that was first stored, and wherein when the selection pattern comprises selecting the designated key for a predetermined number of times, the controller is further configured to switch to the reproduction of the broadcast content included in the particular time section that was stored the predetermined number of times before or after the currently reproducing content.

13. The mobile communication terminal according to claim 12, wherein the memory is further configured to allocate and store the broadcasting content to and in the time sections at predetermined time intervals.

14. The mobile communication terminal according to claim 12, wherein the memory is further configured to allocate and store the broadcasting content to and in the time sections by a predetermined number of frames.

15. The mobile communication terminal according to claim 12, wherein the time sections are set by respective indexes.

16. The mobile communication terminal according to claim 12, wherein the input unit is further to generate a selecting signal to select another time section or a reproducing signal to reproduce a currently receiving broadcasting content during the reproduction of the broadcasting content allocated to a previously selected time section.

17. The mobile communication terminal according to claim 12, wherein the controller is further configured to control the display to display a graphical user interface indicating the stored plurality of time sections on a display of the mobile communication terminal and play, fast forward and rewind trick play indicators at each corresponding time section such that a user can play, fast forward and rewind stored broadcast content corresponding to said each corresponding time section by respectively manipulating the play, fast forward and rewind trick play indicators.

18. The mobile communication terminal according to claim 17, wherein the displayed trick indicators further includes a repeat indicator such that the user can have stored broadcast content corresponding to said each corresponding time section be repeatedly displayed.

19. The mobile communication terminal according to claim 12, wherein the broadcasting content allocated to the selected time section includes a plurality of frames.

20. The mobile communication terminal according to claim 19, wherein first and final frames of the plurality of frames being intra-coded image frames, and other frames being predictive-coded frames.

21. The mobile communication terminal according to claim 12, wherein the controller is further configured to determine whether a presently reproducing stored broadcasting content is synchronized with a presently receiving broadcasting content while reproducing the stored broadcasting content, and to reproduce the presently receiving broadcasting content according to the determination, and wherein the controller is further configured to determine the presently receiving broadcasting content is synchronized with the presently reproducing broadcasting content when a frame of the presently reproducing broadcasting content is a frame in which the broadcasting content is last stored and without using time information of the frames.

* * * * *